(12) United States Patent
Trinh

(10) Patent No.: US 9,957,113 B1
(45) Date of Patent: *May 1, 2018

(54) AUTOMATED VIAL FEED SYSTEM AND METHOD FOR AUTOMATED PRESCRIPTION FULFILLMENT

(71) Applicant: Humana Inc., Louisville, KY (US)

(72) Inventor: Toan Trinh, Phoenix, AZ (US)

(73) Assignee: HUMANA INC., Louisville, KY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/817,451

(22) Filed: Nov. 20, 2017

Related U.S. Application Data

(63) Continuation of application No. 15/455,579, filed on Mar. 10, 2017, now Pat. No. 9,845,201.

(51) Int. Cl.
| | |
|---|---|
| B65G 47/68 | (2006.01) |
| B65G 43/08 | (2006.01) |
| B65G 47/71 | (2006.01) |
| B65G 47/26 | (2006.01) |
| B65G 47/51 | (2006.01) |

(52) U.S. Cl.
CPC .......... B65G 43/08 (2013.01); B65G 47/261 (2013.01); B65G 47/5145 (2013.01); B65G 47/684 (2013.01); B65G 47/71 (2013.01); B65G 2201/0244 (2013.01)

(58) Field of Classification Search
CPC ... B65G 43/08; B65G 47/5145; B65G 47/684
See application file for complete search history.

(56) References Cited

U.S. PATENT DOCUMENTS

| | | | |
|---|---|---|---|
| 3,673,967 A | 7/1972 | Kropf | |
| 3,895,716 A | 7/1975 | Ugo | |
| 6,168,005 B1 * | 1/2001 | Petrovic | B65G 47/5118 198/347.4 |
| 6,206,174 B1 * | 3/2001 | Koltz | B65G 47/715 198/444 |
| 6,575,287 B2 | 6/2003 | Garvey et al. | |
| 6,648,124 B1 * | 11/2003 | Garvey | B65G 47/5145 198/418.6 |
| 6,959,802 B1 | 11/2005 | Garvey | |
| 6,964,329 B1 * | 11/2005 | DiBianca | B65G 47/684 198/347.1 |
| 7,252,186 B2 | 8/2007 | Paquin et al. | |
| 7,322,459 B2 | 1/2008 | Garvey | |
| 7,909,155 B2 * | 3/2011 | Lupton | B65G 43/08 198/357 |
| 9,714,144 B2 * | 7/2017 | Earling | B65G 47/684 |
| 9,845,201 B1 * | 12/2017 | Trinh | B65G 43/08 |
| 2015/0169846 A1 | 6/2015 | Pedrazzini | |
| 2016/0209438 A1 | 7/2016 | Savonsalmi et al. | |

* cited by examiner

*Primary Examiner* — Thomas Randazzo
(74) *Attorney, Agent, or Firm* — Standley Law Group LLP

(57) ABSTRACT

An automated vial feed system for an automated prescription filling system. The system has a plurality of sensors located above a vial distribution table for controlling the pace of vial delivery to the table. The sensors determine the load of vials on the table and a control system uses the information as feedback to the vial delivery system.

7 Claims, 6 Drawing Sheets

AUTOMATED VIAL FEED SYSTEM AND METHOD FOR AUTOMATED PRESCRIPTION FULFILLMENT

This application is a continuation of U.S. application Ser. No. 15/455,579, filed Mar. 10, 2017, the content of which is hereby incorporated by reference as if fully recited herein.

BACKGROUND

The present invention is directed to the field of automated dispensing systems, more particularly to the transport of objects such as pharmacy bottles/vials through an automated dispensing system. The present invention relates to an automated vial feed system for an automated prescription filling system. The system has a plurality of sensors located above a vial distribution table for controlling the pace of vial delivery to the table. The sensors determine the load of vials on the table and a control system uses the information as feedback to the vial delivery system.

Many health benefit plan providers and retail pharmacies offer their clients the option of obtaining prescription drugs by mail. Mail order pharmacies ship prescription drugs to a client's home so the client is not required to visit a pharmacy to fill a prescription in person. For clients with chronic conditions or other health conditions that require maintenance drugs, a mail order prescription program is an attractive benefit because it is more convenient for the clients and typically less expensive than obtaining prescription drugs at a neighborhood pharmacy.

Most mail order pharmacies use automated systems and dispensing lines to process and ship a high volume of prescriptions on a daily basis. Each prescription medication is typically dispensed into a vial or other container labeled with data from an electronic order that identifies the patient, drug (e.g., by NDC), dosage, and quantity. Each medication is dispensed in its own vial and in many instances, multiple vials are combined into a single package and shipped to a single address for a client with one or more chronic conditions requiring multiple medications. The automated dispensing system, therefore, must be intelligent and capable of determining which vials should be combined into a single package and routing them accordingly. Sensors deployed at many locations along the system detect the prescription information on the bottles along with RFID tag information to intelligently route and divert the vials to the appropriate conveyor or destination. If the vial is to be combined with other vials (multi-vial order), the vials are sorted and grouped together, preferably towards the end of the dispensing line. The vials are ultimately routed to the final location for packaging and mailing to the consumer.

Depending upon how the technology is implemented and deployed within a mail order pharmacy, a substantial number of steps in the fulfillment process may be automated and the need for human intervention minimized. Transporting bottles through the automated dispensing lines in an efficient, timely, accurate, and consistent manner is crucial for filling the high volume of mail order prescriptions.

Product conveyor and accumulation systems are previously known. For example, U.S. Pat. Nos. 6,575,287 and 6,648,124, describe product conveying and accumulation systems for transporting products from an upstream to downstream location. These systems are comprised of multiple conveyors positioned next to each to move objects from one end of the conveyor to the other end. These systems can also be used with guide rails and object guides to move objects to desired locations or outbound channels. If these outbound channels are full or backed up, the objects are allowed to circulate around the conveyor system until a channel becomes free.

The present invention relates to a new type of automated pharmacy prescription fulfillment system using specifically configured mass flow conveyor tables at predetermined points in the system to route vials to desired destinations within the automated pharmacy system. These mass flow conveyor tables allow vials to move along the conveyors systems in a mass flow rather than a single-file line. These mass flow tables eliminate the need for complex control systems, reduce the need for many diversion mechanisms for diverting vials off single-file conveyor lanes, and reduces the need for many sensors for sensing and balancing vial loads on single-lane conveyors. For example, use of mass flow conveyor tables at certain predetermined points of the automated pharmacy system can be used to accumulate vials and/or to distribute them to outbound conveyor lanes automatically as these outbound lanes become available (or open up). These mass flow conveyor tables can also be configured to provide overflow lanes in case the primary lanes back up.

The present system uses specifically configured mass flow vial conveyor systems at predetermined locations of the automated pharmacy line to fill prescriptions orders in a more effective, faster, and efficient way than traditional conveyor systems using single-file conveyor lines.

SUMMARY OF THE GENERAL INVENTIVE CONCEPT

In one embodiment of the invention, the invention is comprised of: a vial distribution table comprised of an inbound lane and a plurality of outbound lanes, a first conveyor lane for moving vials around the vial distribution table, the first conveyor lane comprised of an inside portion, middle portion and outside portion, wherein the system is configured to accept vial delivery from the inbound lane; a first sensor positioned over or under the middle portion of the first conveyor lane for detecting the presence of vials moving on the middle portion of the first conveyor lane; a second sensor positioned over or under the inside portion of the first conveyor lane for detecting the presence of vials moving on the inside portion of the first conveyor lane; a first control processing system, the control processing system programmed with instructions executing on the processing system for: 1) receiving input from the first and second sensors; 2) generating a control signal to slow down the pace of vial delivery when vials are detected by the first sensor; 3) generating a control signal to stop vial delivery when vials are detected by the second sensor.

The foregoing and other features and advantages of the present invention will be apparent from the following more detailed description of the particular embodiments, as illustrated in the accompanying drawings.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF EXEMPLARY EMBODIMENT(S)

The following detailed description of the exemplary embodiments refers to the accompanying figures that form a part thereof. The detailed description provides explanations by way of exemplary embodiments. It is to be understood that other embodiments may be used having mechanical and electrical changes that incorporate the scope of the present invention without departing from the spirit of the invention.

The present invention relates to an automated prescription filling system using various mass flow vial conveyor systems for accumulating and/or distributing vials for prescription fulfillment. Mass flow conveyor systems or tables at various locations in the pharmacy line move bottles/vials in mass quantities as opposed to a single-file, dedicated, conveyor line process used at traditional automated pharmacy fulfillment systems. Use of these mass flow conveyor systems increases speed and increases reliability of the pharmacy line by reducing the number of controls needed for a single-file type pharmacy line.

The present invention is comprised of an automated vial feed system for an automated prescription filling system (or a hopper feeding system). The system uses feedback control of an elevator conveyor system in the hopper for feeding vials into the system.

The automated vial feed system is comprised of at least one vial storage container (e.g., "hopper"), at least one vial orientation device (or "orientor") and the mass flow vial accumulation and distribution conveyor system. The mass flow vial accumulation and distribution conveyor system (the "distribution table") collects vials for, and delivers them to 14 labelers. In the embodiment of the invention, the system has two hoppers and two orientors, and one distribution table.

Figure 1:
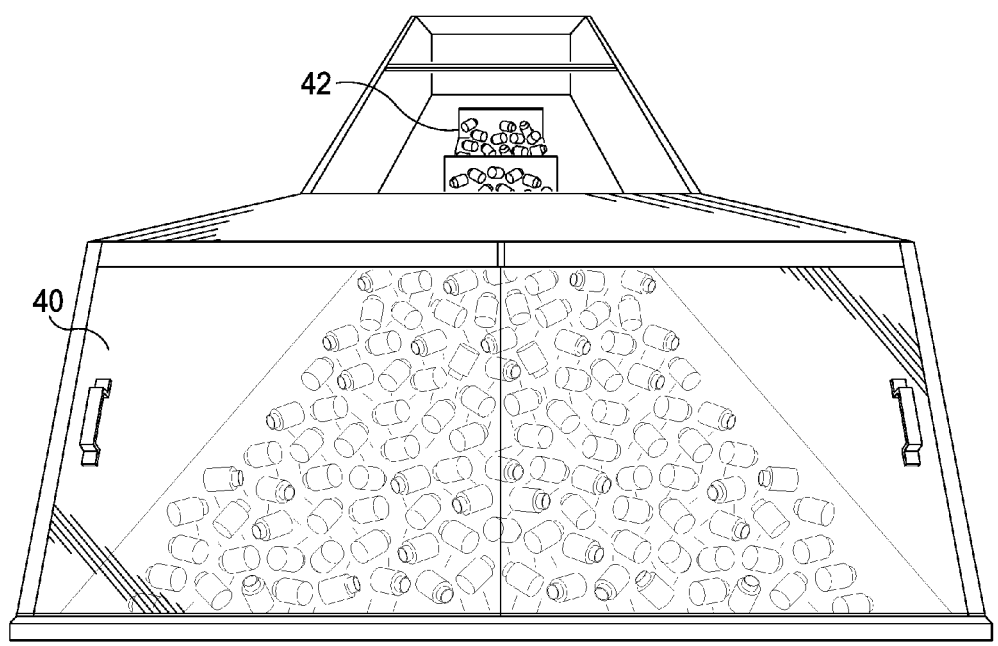
FIG. 1 illustrates one embodiment of the vial hopper.
Figure 2:
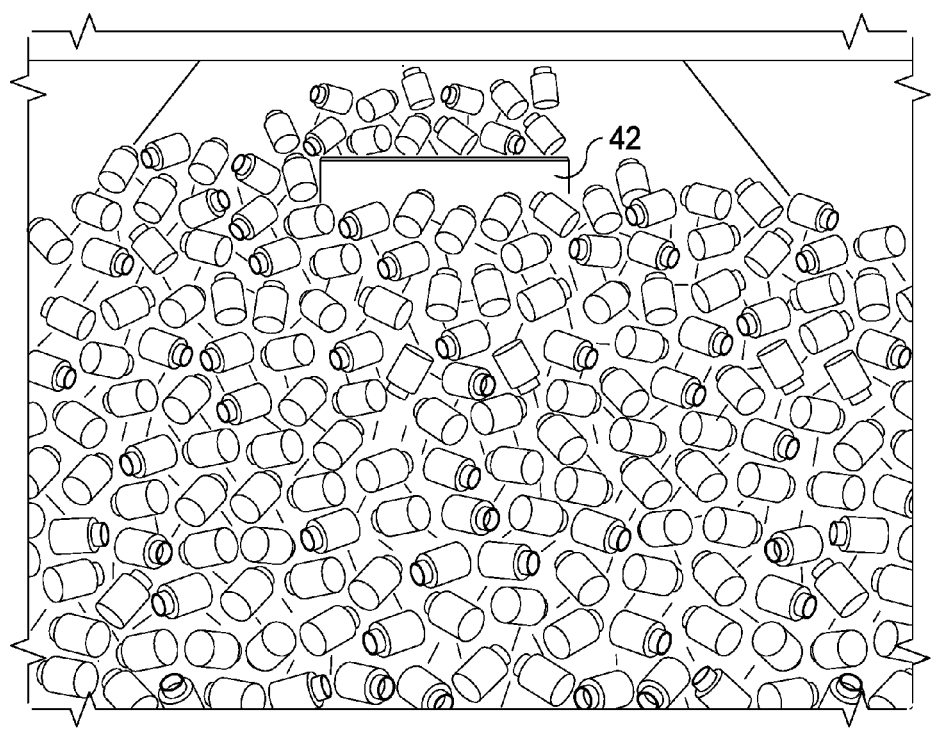
FIG. 2 illustrates a close-up view of the elevator system that carries vials from the hopper to the chute.

The hopper holds the empty vials and is operationally connected to a belt-operated elevator that carries the vials to a chute. FIG. 1 shows one embodiment of the vial hopper 40. FIG. 2 illustrates a close-up view of the elevator system 42 that carries vials from the hopper to the chute. From the elevator, the vials slide down the chute into the orientor. It is appreciated that other mechanisms can be used to provide vials from the storage hopper to the chute and to the outfeed conveyor. For example, a grab-and-place mechanism may be used or pneumatic system or conveyor system.

The orientor uses centrifugal force with a guidance system to position vials upright before depositing them onto the outfeed conveyor. In one embodiment, the outfeed conveyor sends vials to the distribution table at a rate of 250 vials per minute.

The controls structure that operates the hopper, the orientor and the distribution table is preferably comprised of two programmable logic controllers (PLCs) that exist separately from the main PLC control network of the system, and almost two dozen photo-electric (PE) sensors that respond to if/then commands.

In one embodiment, there are two sensors specific to the orientor and distribution table that are connected to the larger main programmable logic controller (PLC) network. These sensors help oversee vial delivery and accumulation between the hopper and the distribution table. These two sensors provide specific if/then commands to (and from) the hopper, orientor and distribution table.

Orientor PLC and Photoelectric (PE) Sensor

This orientor PLC is operationally connected to the orientor and the vial hopper. This sensor system performs several functions. First, it ensures the orientor and outfeed conveyor run at the same speed. This keeps vials from jamming as they exit the orientor. Similarly, not allowing the conveyor to stop, further reduces any risk of jams. Second, if the distribution table happens to fill up with too many vials—a scenario unlikely to manifest because of the controls architecture—then the orientor's PLC will instruct the hopper elevator to stop delivering vials. In this scenario, the orientor continues to rotate and the outfeed conveyor continues to move, but vials are not delivered from the hopper elevator to the orientor until the distribution table PLC (more detail on this process described below) indicates the need for more. Third, the orientor's PLC communicates with the PE sensor that detects any vials delivered upside-down from the orientor ("upside-down" vial sensor). The chances of such an event are remote but if it does arise, an air nozzle will respond by blowing the upside-down vial into a reject bin.

The orientor's PLC talks not only with the hopper elevator and the upside-down vial detection sensor, but also with the distribution table's PLC. The PLC at the distribution table alerts the PLC at the orientor when the table is full so that the orientor PLC can instruct the hopper elevator to stop delivering vials until the distribution table is ready to accept more vials.

Distribution Table PLC and PE Sensors

The second PLC on the hopper-orientor-distribution table setup is positioned near, and runs, the distribution table. While this PLC oversees the distribution table, it does communicate with the embedded PLC that controls the orientor and the hopper.

Figure 3:
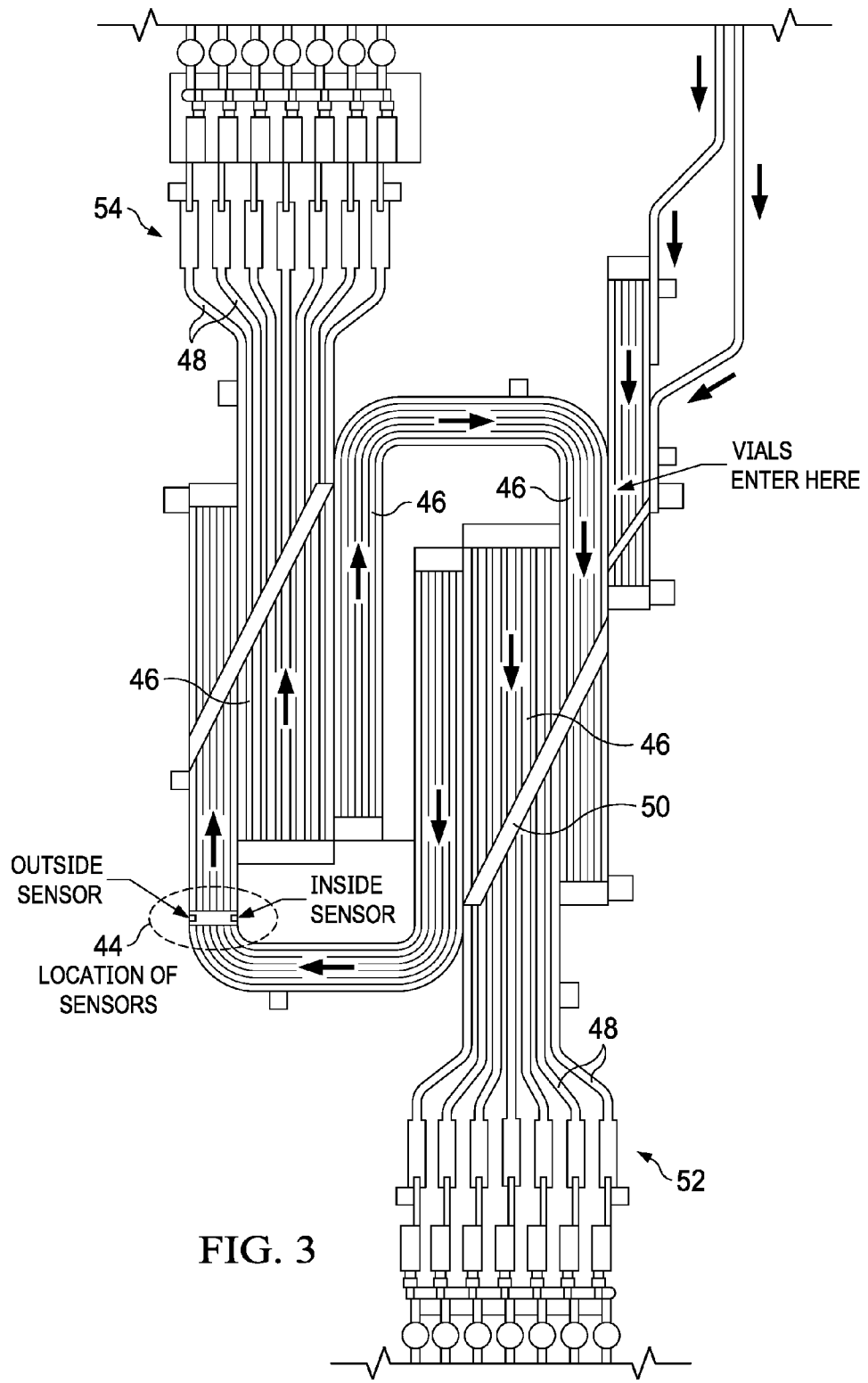
FIG. 3 illustrates one embodiment of the vial distribution table of the present invention.

The distribution table's PLC interacts with the PE sensors on the table that monitors vial levels. In the preferred embodiment, this distribution table has two identical ends, each of which has seven outbound lanes, that output vials to the 14 labelers. FIG. 3 illustrates one embodiment of the mass flow vial accumulation and distribution conveyor system 14 (i.e., distribution conveyor table) between the vial hoppers (loaders) and vial labelers of the present invention (i.e., a top plan diagram of the table). On one end, above the conveyor that sends vials around in a continuous and circular motion, there are three mounted photoelectric (PE) sensors (outside sensor, middle sensor, inside sensor). The location of these sensors is shown generally at 44. The vials enter at one side of the table (vials fed from the hoppers), and move around the table as shown by the arrows on the table. The vials are transported around the table on the conveyors 46 as shown. Vials are fed into the system on an in-feed conveyor (see FIG. 4 labeled "vials enter here"). The plurality of conveyors that make up the distribution conveyor table are configured to run adjacent to each other and can be mated or interlocked with each other which is known in the industry.

The vials move around the table and move into one of the open outbound lanes 48. In this embodiment, there are 14 outbound lanes. Each of the outbound lanes leads to a vial labeler for labeling the vial with a prescription label and barcode and marrying the vial to a puck having a RFID tag. "Marrying" in this context means that the control system of the present invention stores and tracks the RFID tag identification on each puck and associates it with a prescription label or barcode. In this way, RFID readers placed around the system allow the control system to know exactly where each vial/prescription is located in the system.

If an outbound lane is completely full or backed up (meaning the entire outbound lane is full of vials so that no more vials can enter the lane opening 50—there are 14 lane openings, one for each outbound lane), then the vials on the table will keep circulating around the table until one of the lanes opens up. In other words, once the vials enter the table, they hit the first set of 7 outbound lanes 52. If these lanes are all full, the vials will move around the table and hit the second set of 7 outbound lanes 54. If all these lanes are full, the vials will continue to circulate around to the table again hitting the first set of outbound lanes. The control sensors on the table will operate to ensure that the flow of vials fed from the hopper is regulated so the table does not become completely full and clogged.

In one embodiment, the three sensors are photoelectric sensors for detecting whether a vial is on the table below it (in this embodiment, the sensors are placed above the table to detect vials moving on the table below the sensors however it is appreciated that the system may be configured to place the sensors below the vials). If the sensor becomes "blocked" (meaning that a vial is detected under it), the sensors will turn from green to orange. The outside sensor stays orange as long as there are vials on the table because that indicates normal vial flow (when the distribution table is running, the vials nest together tightly and tend to accumulate on the outside of the table). When the middle sensor turns orange, that means vials are accumulating and a control signal is sent to the vial hopper (PLC) to slow down the pace of vial delivery. When the inside sensor goes orange, a control signal is sent to stop the vial hopper because the table is reaching maximum capacity. If the vial hopper is stopped, vials continue to feed from the table to the labelers but the vial hopper won't resume feeding vials until the middle and inside sensors indicate there are no vials detected on the table (e.g., turn green).

Figure 4:
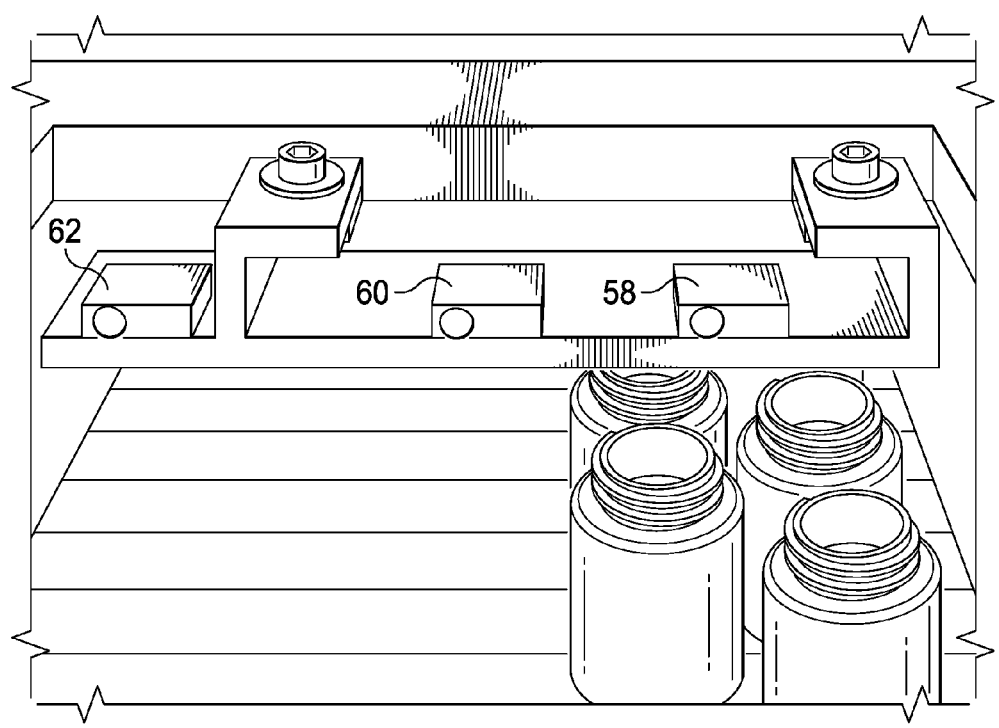
FIG. 4 illustrates a top view of the three sensors of the present invention.

In this embodiment, the outside sensor indicates normal flow. If the middle sensor becomes blocked, that section of the table is half full. At that point, the distribution table's PLC will tell the orientor's PLC to slow the hopper elevator that delivers vials to the orientor. If the inside sensor becomes blocked, that means the table has grown full and the hopper elevator stops altogether until instructed to resume operation. FIG. 4 illustrates a top view of the three sensors of the present invention. The outside sensor 58, middle sensor 60, and inside sensor 62 are shown in the figure.

Because the distribution table conveyor keeps empty vials circulating by virtue of its design, those vials will flow to the other side of the table for transport to the labelers. In this embodiment, there are nine motors controlled by variable frequency drives that operate the hopper, orientor and distribution table. The drives are connected to the orientor's PLC so the system can be programmed with motor speeds as needed.

Figure 5:
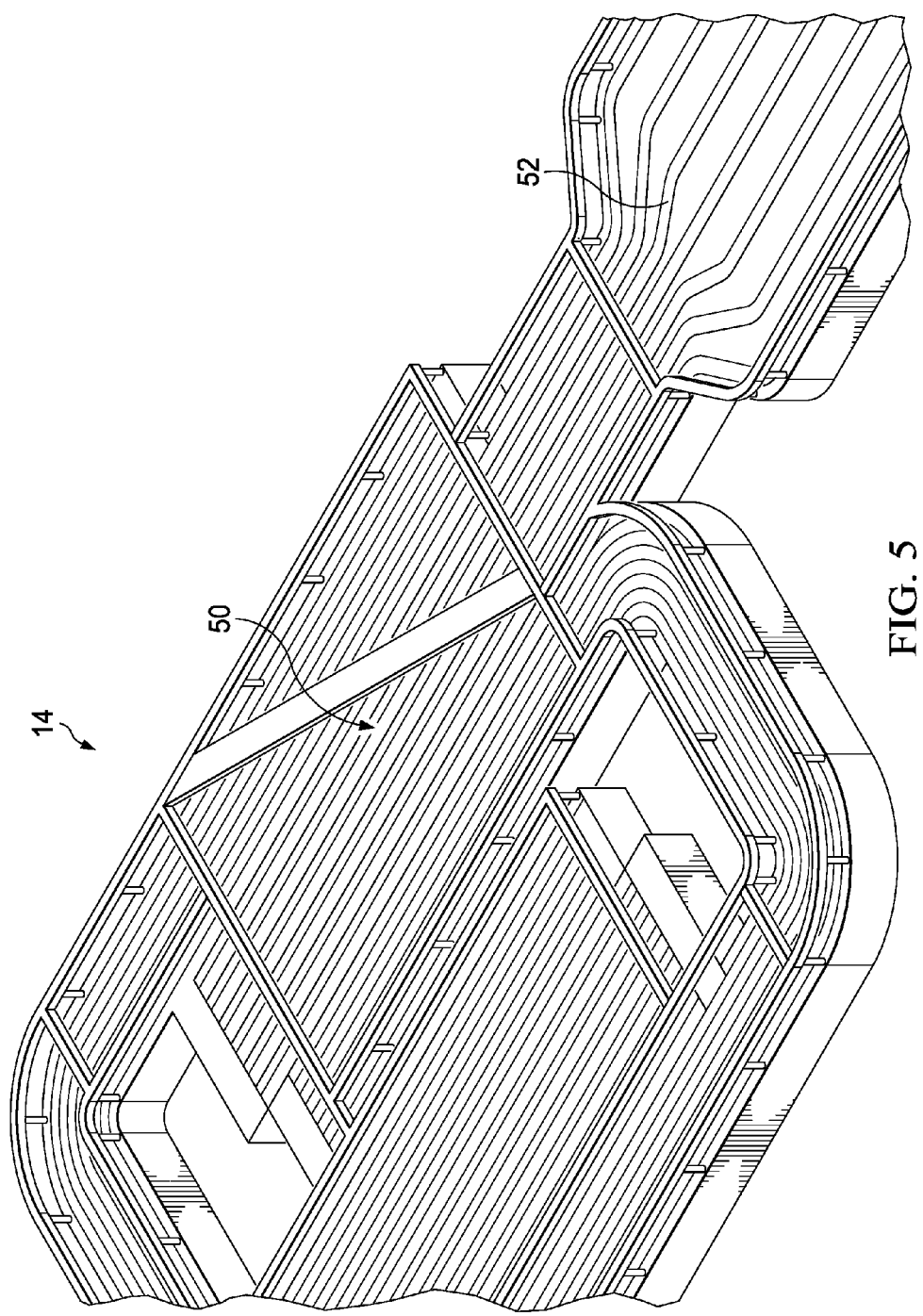
FIG. 5 illustrates a perspective top view of one embodiment of the distribution table of the present invention.

FIG. 5 illustrates a perspective top view of one embodiment of the distribution table of the present invention. The first set of 7 outbound lanes 52 are shown as well as the seven openings to each lane shown generally at 50.

Previous conveyor systems with single-file, dedicated, conveyors relied on up to six individual conveyors that frequently stopped and started in response to sensor commands as vials switched lanes. The mass flow system of the present invention eliminates the need for frequent lane switching. This change cuts down on the need for many PLC- and software-operated controls. For example, there is no longer a dedicated program to perform load balancing in many locations of the system. The present invention also takes additional advantage of geometry and physics to route pucks through the pharmacy line.

Figure 6:
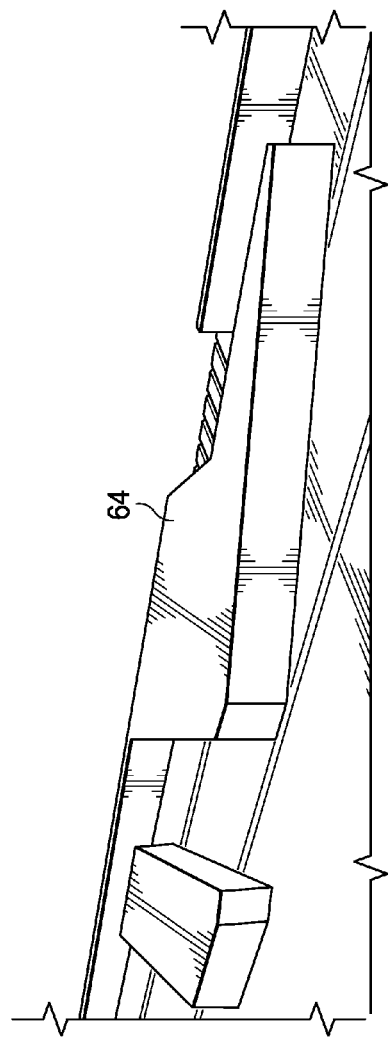
FIG. 6 illustrates one embodiment of the shape of an outbound lane opening.

For example, in one embodiment, of the distribution table each outbound lane opening is formed from pieces of hard white plastic—e.g., ultra-high molecular weight (UHMW) polyethylene barriers or guide portion—placed on the table. FIG. 6 illustrates one embodiment of the shape of an outbound lane opening. These plastic pieces are shaped in such a way as to direct or guide puck flow into the first outbound lane that is not full. In essence, the methodology relies on physics. If enough pucks have gathered in the first outbound labeler lane, for instance, then the shape of the UHMW guide portion will flow the pucks down the moving conveyor to the second outbound labeler lane, and so on down to the fourteenth lane, e.g., analogous to the movement of a cascading waterfall. When one lane fills up, the pucks coming down the table move down to the next open lane. This keeps all 14 lanes to the labelers appropriately full at all times, and balancing the load of vials sent to each labeler.

Pairing these plastic "arms" or barriers or guides 64 with conveyor movement directs puck flow, eliminating the need for many PLC- and software-operated controls (e.g., photoelectric sensors, diverts, puck stops, RFIDs). The UHMW plastic material is extremely durable, known for its ability to resist abrasion and impact. Because of these properties, UHMW's benefits include cutting down on maintenance costs and energy consumption.

The present invention also uses bi-flow and wider belt conveyor design at predetermined locations in the system to assist in increasing the number of scripts that can be filled. Bi-flow refers to a conveyor system with at least two belts placed adjacent (side-by-side) to each other moving in the opposite directions. A wide bi-flow conveyor, operating with fewer photo-eye sensors, RFIDs, diverts and controls, inherently enables more flow and allows circulation of the vials until outbound conveyor lanes open up to handle the vial load.

Figure 7:
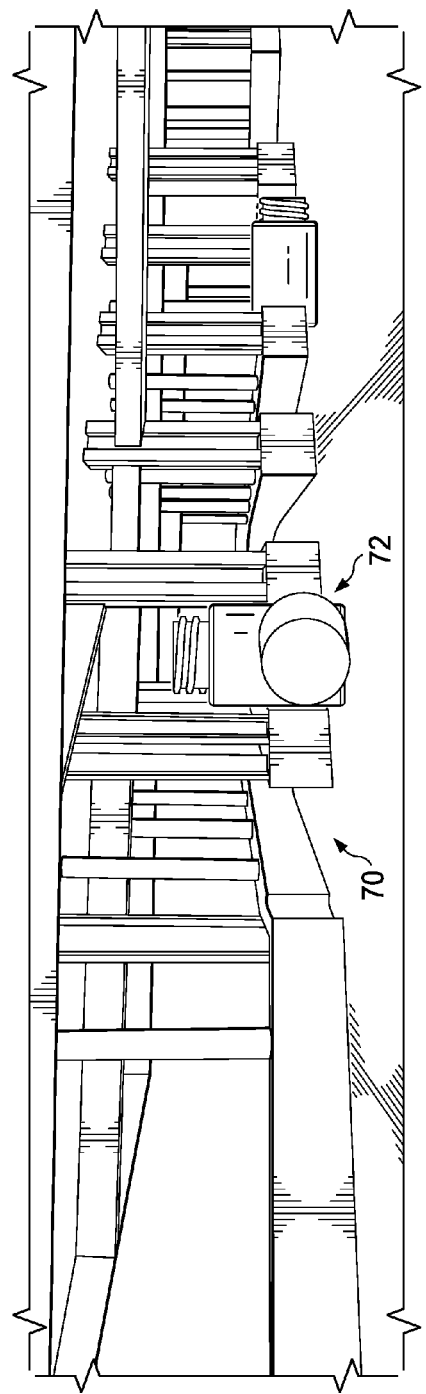
FIG. 7 illustrates a plan side view looking into the seven outbound lanes.

Furthermore, the presence of additional—and faster—labelers speeds up processes. In this embodiment, each labeler takes approximately 2-3 seconds to label a vial. In one embodiment, the system uses 14 labelers and processes one vial every 1.4 seconds. FIG. 7 illustrates a plan side view looking into one set of the seven outbound lanes of the distribution conveyor table. The figure illustrates an open lane 70 and a full lane 72.

As discussed, once the vials leave the distribution conveyor table via one of the 14 outbound lanes, they travel to a vial labeler that places a prescription label on the vial. In one embodiment, there are 14 labelers, where one labeler is dedicated to one outbound lane of the distribution conveyor table. In this embodiment the prescription label includes a barcode tied to prescription information stored in the system. The vial is also placed in a puck for transportation through the system. The puck has a RFID tag and the system stores the information relating to the RFID tag and the prescription information, and associates them together, so that the vial can be tracked as it moves through the system (i.e., the vial prescription is "married" to the puck). For example, RFID receivers or readers are placed strategically along the automated prescription system so that the control system knows exactly where each prescription is located. This is important for orders having multiple prescriptions ("multi-vial" order) because the system tries to keep each prescription of the order relatively close to each other as they travel through the system.

While certain embodiments of the present invention are described in detail above, the scope of the invention is not to be considered limited by such disclosure, and modifications are possible without departing from the spirit of the invention as evidenced by the following claims.

What is claimed is:

1. An automated vial feed system for an automated prescription fulfillment system, comprising:
    a vial distribution table comprised of an inbound lane and an outbound lane, a first conveyor lane for moving vials around the vial distribution table, the first conveyor lane comprised of an inside portion, middle portion and outside portion, wherein the system is configured to accept vial delivery from the inbound lane;
    a first sensor positioned over or under the middle portion of the first conveyor lane for detecting the presence of vials moving on the middle portion of the first conveyor lane;
    a first control processing system, the control processing system programmed with instructions executing on the processing system for: 1) receiving input from the first sensor; 2) generating a control signal to slow down the pace of vial delivery when vials are detected by the first sensor.

2. The system of claim 1, further comprising:
    a second sensor positioned over or under the inside portion of the first conveyor lane for detecting the presence of vials moving on the inside portion of the first conveyor lane; and
    wherein the first control processing system is programmed with instructions executing on the processing system for: 1) receiving input from the second sensor; and 2) generating a control signal to stop vial delivery when vials are detected by the second sensor.

3. The system of claim 2, further comprising:
    a vial storage container for storing vials;
    an outfeed conveyor for delivering vials from the vial storage container to the inbound lane of the vial distribution table.

4. The system of claim 3, further comprising:
    a means for providing vials from the vial storage container to the outfeed conveyor.

5. The system of claim 4, wherein the means for providing vials from the vial storage container is an elevator mechanism.

6. The system of claim 4, further comprising:
    a second control processing system, the control processing system programmed with instructions executing on the processing system for: 1) receiving control signals from the first control processing system; 2) controlling the means for providing vials from the vial storage container based on the received control signals.

7. The system of claim 6, wherein the second control processing system is programmed with instructions executing on the processing system for: slowing down the pace of vial delivery when vials are detected by the first sensor; 3) stopping vial delivery when vials are detected by the second sensor.

* * * * *